United States Patent
Lee

(10) Patent No.: US 7,949,320 B1
(45) Date of Patent: May 24, 2011

(54) CONSTANT MODULUS INDICATION FOR DETECTION OF RF SIGNALS

(75) Inventor: Chris Cheng-Chieh Lee, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 567 days.

(21) Appl. No.: 12/115,326

(22) Filed: May 5, 2008

Related U.S. Application Data

(60) Provisional application No. 60/916,055, filed on May 4, 2007, provisional application No. 60/917,387, filed on May 11, 2007.

(51) Int. Cl.
*H04B 1/16* (2006.01)
*H04B 17/00* (2006.01)
*H04B 1/10* (2006.01)

(52) U.S. Cl. ............... 455/205; 455/226.4; 455/296

(58) Field of Classification Search .......... 455/205, 455/226.1–226.4, 280, 296; 375/346
See application file for complete search history.

(56) References Cited

U.S. PATENT DOCUMENTS

| 5,442,709 | A | 8/1995 | Vogt et al. |
| 6,490,318 | B1 | 12/2002 | Larsson et al. |
| 2007/0036249 | A1* | 2/2007 | Shatara et al. ............... 375/347 |
| 2008/0287072 | A1* | 11/2008 | Elenes et al. .................. 455/73 |

OTHER PUBLICATIONS

Hentschel, et al. "The Digital Front-End of Software Radio Terminals," IEEE Personal Communications pp. 6-12 (1999).

* cited by examiner

*Primary Examiner* — Nguyen Vo

(57) ABSTRACT

In a technique for detecting single or multiple channels in a broadcast RF signal, a receiver determines a constant modulus indication value for each frequency of the receiver's local oscillator, as that oscillator is tuned across a range of possible channel frequencies. The receiver may determine this constant modulus indication value by determining the magnitudes of a constant modulus signal and a noise signal, for a signal output from a digital front end, that signal representing a mixing of the local oscillator frequency signal with the broadcast RF signal and a channelization thereof. As the local oscillator frequency signal is tuned through the range of possible channel frequencies, the receiver evaluates the constant modulus indication value course and or fine frequency increments to determine if the constant modulus indication value at any frequency rises above a threshold value, thereby indicating that the local oscillator frequency signal has locked onto an RF channel in the original RF signal.

21 Claims, 14 Drawing Sheets

$F_{LO}$ = 100 kHz
RSSI = 26.7
CMI = 3.9

$F_{LO}$ = 200 kHz
RSSI = 36.1
CMI = 0.46

$F_{LO}$ = 300 kHz
RSSI = 73.32
CMI = 19.95

$F_{LO}$ = 400 kHz
RSSI = 33.21
CMI = 1.03

$F_{LO}$ = 500 kHz
RSSI = 51.63
CMI = 13.91

CONSTANT MODULUS INDICATION FOR DETECTION OF RF SIGNALS

CROSS-REFERENCE TO RELATED APPLICATION

The present application claims the benefit of U.S. Provisional Application No. 60/916,055, entitled "Constant Modulus Indication for Detection of FM Signals," filed on May 4, 2007, and U.S. Provisional Application No. 60/917,387, entitled "Methods and Systems for Constant Modulus Indication Measurement of FM Signals over Fading Channels" filed on May 11, 2007, both of which are hereby incorporated by reference herein in their entirety.

FIELD OF TECHNOLOGY

The present disclosure relates generally to communication devices, and more particularly, to techniques for detecting frequency modulated (FM) signals.

DESCRIPTION OF THE RELATED ART

In broadcast radio applications (e.g., 87.8 to 108 MHz in the United States), a frequency modulated (FM) signal is formed of a stereophonic multiplex signal (MPX) containing a modulated addition signal (L+R) and a subcarrier modulated difference signal (L−R), and a pilot tone signal. Such FM signals can be detected according to two statistics derived from the FM signals.

For example, an RF receiver may determine a carrier frequency offset which translates into a DC offset on the MPX signal. When the local oscillator in the RF receiver has a frequency ($F_{LO}$) near that of the FM channel's carrier frequency, $F_C$, a negative MPX DC Offset (MDO) will indicate that the $F_{LO}$ is less than $F_C$, while a positive MDO will indicate that $F_{LO}$ is greater than $F_C$. When $F_{LO}$ is close to $F_C$, the MDO approximates a zero value. Thus, the following formula may be used:

$$F_{LO}-F_C=\lambda MDO \text{ for some } \lambda>0 \quad \text{(Equation 1)}$$

By measuring the MDO of a received FM signal, the RF receiver can determine the difference between the local oscillator's frequency and the transmitted carrier frequency and tune the local oscillator until an exact frequency match, or lock, occurs.

The received signal strength indicator (RSSI) is a well-used technique to detect RF signal energy within a bandwidth of interest. RSSI is usually determined at the intermediate frequency (IF) stage or from a baseband signal. Because RSSI indicates the relative strength of all signals within a specified bandwidth, RSSI is the most commonly used technique for FM signal reception, and is also used to detect phase shift keying (PSK) and other modulation scheme signals. To combine the MDO and RSSI for FM signal detection, the RSSI may be first used to find a signal of sufficient strength, and then the MDO may be used to fine tune the $F_{LO}$ to lock onto $F_C$. Unfortunately, both RSSI and DMO computations typically take longer than approximate 30 to 40 ms each step to complete.

FIG. 1 illustrates a prior art system 100 applying an RSSI-based approach. The system 100 computes an 8-bit representation (3-bit fractional) of $\log_2$ of a low-pass filtered signal. A digital front end 102 performs channelization to select the channel of interest in the FM signal, which may include converting the FM signal to a baseband, performing channel filtering, and possibly despreading.

The digital front end (DFE) 102 supplies the FM signal (more particularly the identified FM channel) to an FM demodulator 104, which decodes the channel signal into a stereophonic audio portion and a radio data system (RDS) portion (digital data). Separately, a block 106 determines the magnitude of the FM channel signal from the digital front end 102, while a block 108 takes that magnitude signal and passes it through a low pass filter that removes spurious spikes to produce a lowpass filtered energy signal. A block 110 converts this lowpass filtered energy signal to a decibel value that serves as the normalized RSSI indicating signal strength for the FM channel identified by the DFE 102. Thus, the normalized RSSI can be computed as follows, where e is the magnitude of the energy signal:

$$10 \log_{10}(e) = 10 \log_{10}2 \frac{\log_2 e}{8} \approx 0.379 \log_2 e \quad \text{(Equation 2)}$$

From the normalized RSSI signal, the absolute (or un-normalized) RSSI can be computed by subtracting both the low noise amplifier (LNA) gain and the intermediate frequency (IF) gain as follows:

$$RSSI=0.379 \log_2 e-(LNA_{Gain}-24)-(IF_{Gain}-18) \quad \text{(Equation 3)}$$

The system 100 starts with a local oscillator (not shown) frequency ($F_{LO}$) that is equal to a first carrier frequency, $F_C$, that corresponds to a current available channel carrier frequency. As part of a course frequency locking step, the frequency $F_{LO}$ is then incremented upwards or downwards by a step frequency amount corresponding to the channel spacings, e.g., 100 kHz. $F_{LO}$ is incremented until the value of the MDO offset drops below 0, indicating that a channel corresponds to a previous (lower frequency) channel, or until the MDO offset rises above 0 indicating that an upcoming (high frequency signal) is likely the channel of interest. When a transition in MDO offset occurs, the system 100 may begin incrementing the $F_{LO}$ at smaller increments (e.g., +/−25 kHz) corresponding to actual channel bandwidths to identify the signal. As the $F_{LO}$ is being incremented, if the RSSI becomes greater than a threshold value, then the system 100 determines that the $F_{LO}$ frequency is approaching broadcast $F_C$ frequency and therefore the FM signal as been detected.

Once this coarse measurement has been detected, the system 100 may then increment up and down from the $F_{LO}$ by a smaller amount, e.g., 2.5 kHz, until the value MDO is less than or equal to 0 or the value of MDO is great than or equal to 0. When the MDO approaches or reaches 0, then the $F_{LO}$ is set to $F_C$, otherwise the system 100 goes back to the coarse frequency locking step, and the $F_{LO}$ signal is incremented/decremented to another 100 kHz channel range.

There are limitations to the RSSI-based approach. MDO determinations are time consuming (e.g., 30-40 ms) and require at least two calculations (MDO max and MDO min) in each increment cycle. Plus, each fine tune adjustment on the MDO can take another 30-40 ms to complete. Furthermore, RSSI signals lack sufficient frequency resolution for accurate identification, especially when adjacent channels exist in an FM signal and have high intensity values. Frequency resolution can be improved through the use of low pass filters before the RSSI computation, but only with limited success. A further limitation is that with the RSSI technique, weak (low RSSI) signals may go completely undetected if they do not have adjacent channel interferers (ACIs). In other words, the need to set high thresholds to avoid the problem of high intensity adjacent channels also limits a receiver's effectiveness is detecting weak FM signals.

SUMMARY OF THE DISCLOSURE

In one embodiment, a method for detecting a radio frequency (RF) signal in a receiver, the RF signal having at least one narrowband channel within a wideband spectrum for the RF signal, includes; mixing a local oscillator signal with the received RF signal to produce a mixed signal, wherein the local oscillator signal has a frequency at a first channel frequency; converting the mixed signal to a digital mixed signal; determining an RF channel signal from the digital mixed signal; determining a magnitude of a constant modulus signal for the RF channel signal; determining a magnitude of a noise signal for the RF channel signal; and comparing the magnitude of the constant modulus signal with the magnitude of the noise signal to produce a constant modulus indication value indicating a ratio of the magnitude of the constant modulus signal to the magnitude of the noise signal.

In another embodiment, A radio frequency (RF) signal processing apparatus, for use in a receiver for detecting a RF signal having at least one narrowband channel within a wideband spectrum for the RF signal, the receiver having an antenna for receiving the RF signal, a low noise amplifier and RF filter, a mixer for mixing the RF signal with a local oscillator signal a local oscillator frequency to produce a mixed RF signal, and an analog-to-digital converter for converting the mixed signal to a digital mixed signal, said apparatus includes: a digital front end for determining an RF channel signal from the digital mixed signal; and a constant modulus indication apparatus configured to receive the RF channel signal from the digital front end and to determine a magnitude of a constant modulus signal for the RF channel signal, to determine a magnitude of a noise signal for the RF channel signal, and to compare the magnitude of the constant modulus signal with the magnitude of the noise signal to produce a constant modulus indication value indicating a ratio of the magnitude of the constant modulus signal to the magnitude of the noise signal.

DETAILED DESCRIPTION

The present application discusses techniques for detecting an FM signal by analyzing the signal to determine a constant modulus indication (CMI) value in place of the traditional techniques of measuring RSSI or MDO. A perfect FM signal would sit on a constant modulus circle, e.g., a constant circle when the in-phase (I) and quadrature phase (Q) terms of a received signal are plotted. Therefore, when the local oscillator on an RF receiver has a frequency, $F_{LO}$, that approximates that of the carrier frequency, $F_C$, of the transmitted FM signal, plotting the I and Q terms of the FM channel output from the receiver's digital front end (DFE) circuit will produce scattered values around an ideal circle. The higher the accuracy of $F_{LO}$ to $F_C$, the more defined and circular the plot of the I and Q terms becomes, that is the more localized the scattered points become and the tighter the circular plot.

The present application proposes a new metric for assessing the accuracy of the identifying the carrier frequencies and corresponding channels in a radio frequency broadcast, through the use of a constant modulus indication (CMI) value. To define CMI, the output signal, S, from a DEF is identified by the expression S=C+N, where C is a constant modulus signal (with a radius r) and where N is a noise signal having a deviation n from that ideal constant modulus signal. The CMI for the expression S is defined as the ratio of the energy of C to that of N using the following expression, where E[variable] indicates an expected or averaged value of the signal energy:

$$CMI(S) = 10 \log_{10} \frac{E[C]}{E[N]} = 10 \log_{10} \frac{r^2}{n^2} \qquad \text{(Equation 4)}$$

From this expression, it is apparent that as the noise value, N, decreases, and the $F_{LO}$ approaches $F_C$, the value for CMI will increase. A perfect match in which $F_{LO}$ equals $F_C$ and no communication noise is reflected by C=1 and N=0 would result in a CMI value of infinity.

Figure 2:
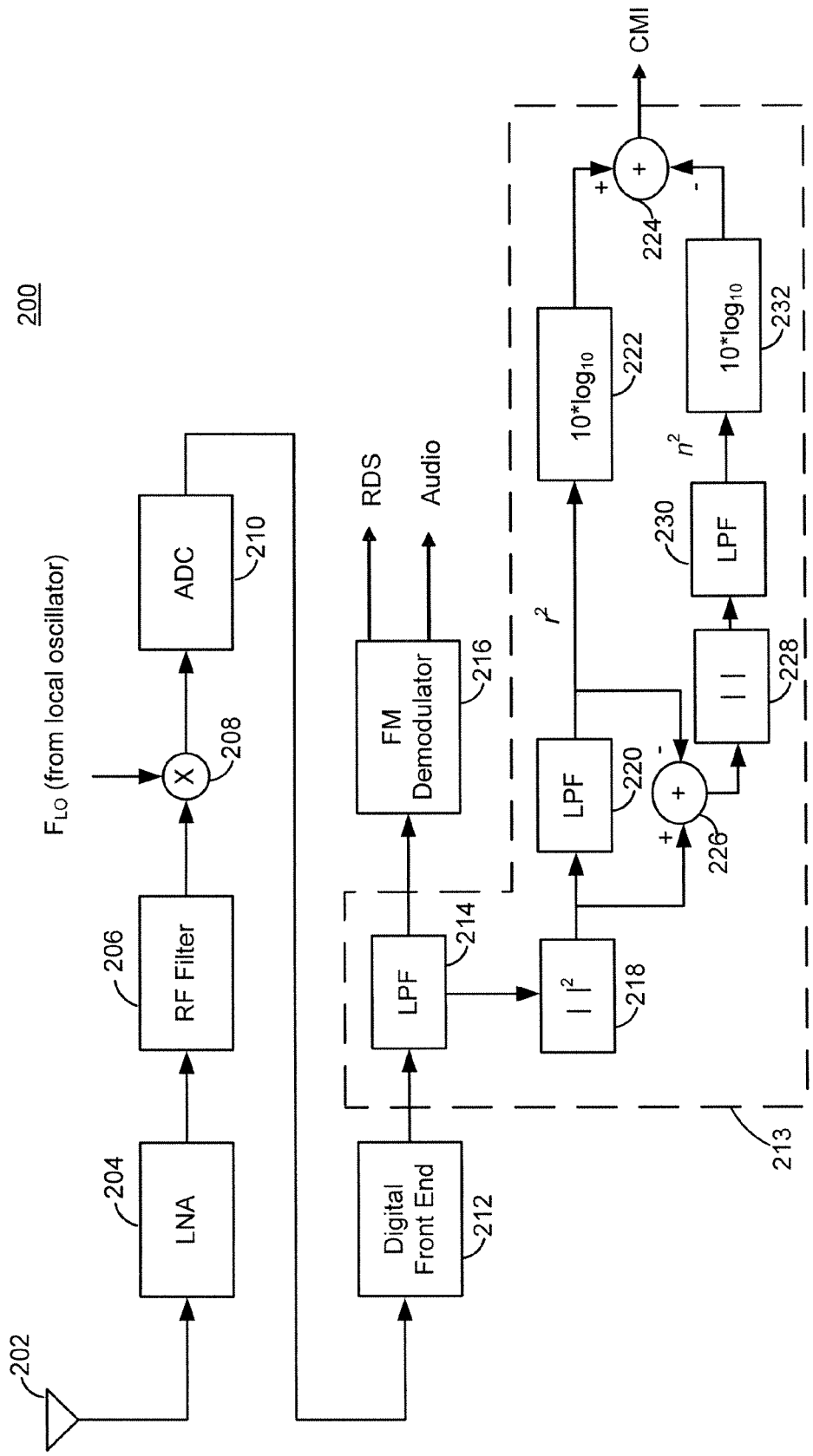
FIG. 2 is a block diagram of a system for decoding an FM signal having a constant modulation indication calculator.

FIG. 2 illustrates a circuit 200 for determining CMI during RF signal decoding. An RF antenna 202 couples a received RF signal to a LNA gain amplifier 204 before the RF signal is passed to an RF filter 206 and mixed with the $F_{LO}$ signal from the local oscillator at a mixer 208. The mixed RF and $F_{LO}$ signal is converted from analog to digital by the A/D converter (ADC) 210 and passed to the DFE 212 for channelization. The DFE 212 performs channelization to select the channel of interest in the FM signal, by for example, converting the FM signal to a intermediate or baseband frequency, performing channel filtering on the converted RF signal, and possibly in some examples performing despreading. The DFE 212 supplies the resulting FM channel signal to a constant modulus indication apparatus 213, which may be implemented in hardware as a dedicated digital signal processor circuit or in software as computer executable instructions on a computer-readable medium accessible to a processor and having instructions for implementing the procedures described herein. In some examples, the digital signal processor may be integrated to perform the operations of the DFE 212, and in some cases the operation of an FM modulator as well.

In the illustrated example, the constant modulus indication apparatus 213 includes a first low pass filter 214 for filtering out noise spikes prior to coupling the signal to a demodulator 216 that produces an RDS signal and an audio signal. In other examples, the low pass filter 214 may be formed within the demodulator 216.

It is noted that the circuit 200 is described in relation to an FM signal. Yet, the received signal may be any signal exhibiting a constant modulus or that may be analyzed using a known constant modulus algorithm. Such signals include phase shift keying (PSK), frequency shift keying (FSK), quadrature-phase shift keying (QPSK), minimum shift keying (MSK), or Gaussian minimum shift keying (GMSK) modulated signals. Furthermore, examples herein reference a particular RF frequency band; however any RF frequency band may be used, e.g., VHF, UHF, SHF, or EHF. Examples include RF allocations within a single band such as the 800 MHz, 900 MHz, or 1900 MHz cellular allocations, all of which are in the UHF band. Further still, the applied channel bandwidths may vary, e.g., 30 kHz, 200 kHz, 1250 MHz, or 5 MHz.

The filter 214 couples some of the filtered FM channel signal to a magnitude-squared calculator 218 that calculates the squared magnitude of the FM baseband signal, and the output of the magnitude-squared calculator 218 is provided to a second low pass filter 220 that filters the magnitude-squared signal to further compensate for fluctuations in the input RF signal. The filter 220 produces a time-averaged, filtered-output signal ($r^2$) that, in the illustrated example, is converted to a decibel value by decibel calculator 222, along a first branch of a CMI calculating circuit 224. This first branch produces a primary signal to be used in deriving the CMI value.

To identify and correct for a noise portion of the FM channel, the time averaged output signal from the filter 220 is also coupled to a summer block 226 along with the (instantaneous) energy magnitude signal from block 218. The summer block 226 inverts either (preferred) the time average signal or the instantaneous energy magnitude signal to produce a difference magnitude signal that reflects the fluctuations in the instantaneous energy magnitude signal from the time average signal. This difference signal corresponds to the noise portion of the signal in the FM baseband signal. The magnitude of this noise portion is calculated by a magnitude calculator 228 prior to being passed to a third low pass filter 230, which produces a time average output signal, $n^2$. A decibel calculator 232 determines the decibel level for this noise signal and couples the same to the subtractor 224 which subtracts the noise signal magnitude from the primary signal magnitude to produce the CMI value corresponding to the particular $F_{LO}$ and an $F_C$ signal region of the incoming FM signal.

FIGS. 3A-3D illustrate plots of the output CMI value determined by the circuit 200 for different $F_{LO}$ frequencies and compared against RSSI values determined from the audio signal. In the illustrated example, the input RF signal comprised two FM channels: a first signal at 300 kHz, and a second signal at 500 kHz that was 20 dB weaker than the first. Both signals were formed from a 1 kHz tone signal modulated with a deviation frequency, Fdev, of 22.50 kHz. The total RF strength was −60 dBm. A 60 kHz low pass filter was used to improve RSSI frequency resolution. The CMI value was evaluated on a duration of 2048 samples (taking approximately 7.74 ms in this example) to allow the intermediate frequency adjusted gain control to settle. The RSSI measurement ran for 40 ms.

Figure 3A:
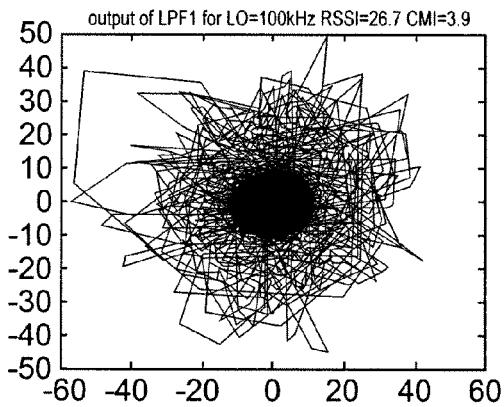
FIGS. 3A-3E illustrates plots of a constant modulus indication determined by the system of FIG. 2 and at different local oscillator frequencies, for an FM signal containing two channel frequencies.
Figure 3B:
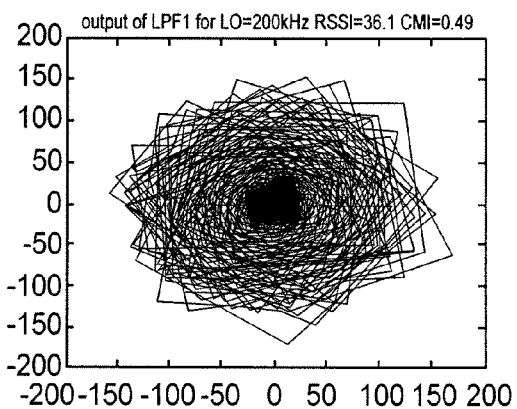

FIGS. 3A and 3B illustrate examples where the $F_{LO}$ was set to 100 kHz and 200 kHz, respectively. The resulting I and Q phase plot from the FM channel signal measured by the DFE 212 exhibit a scattered pattern demonstrating that the local oscillator was not locked onto the incoming carrier frequency, $F_C$. FIG. 3D exhibits a similar characteristic, when the local oscillator has a frequency $F_{LO}$=400 kHz.

Figure 3C:
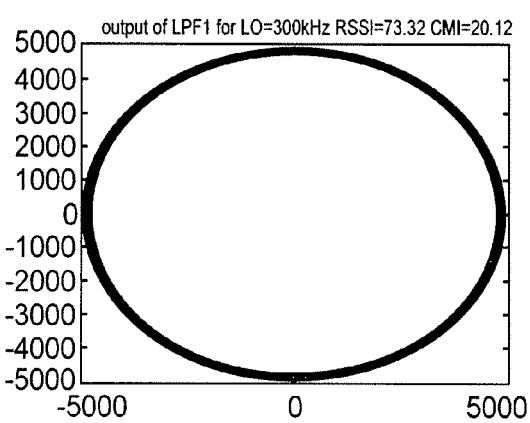
Figure 3D:
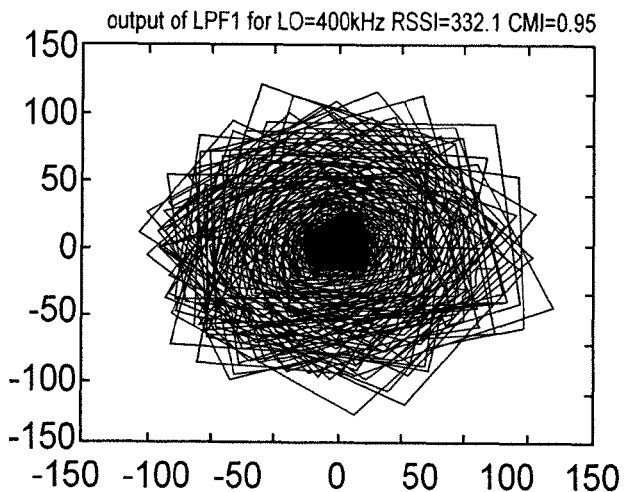
Figure 3E:
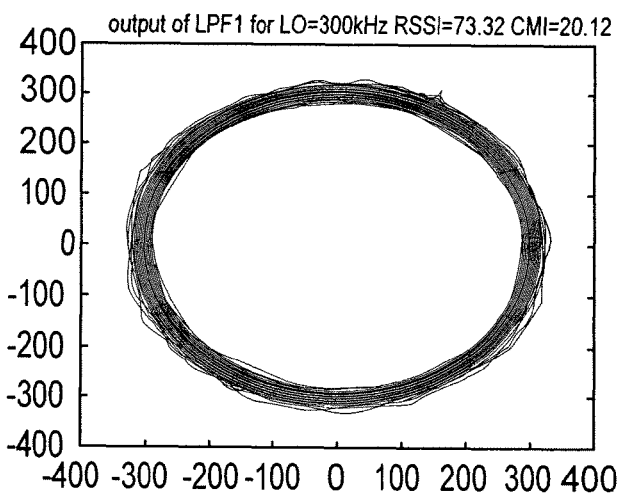

In contrast, FIGS. 3C and 3E show plots when $F_{LO}$ approaches or equals one of the FM channel signals (at the corresponding $F_C$) within the FM signal, 300 kHz and 500 kHz, respectively. In each instance, frequency locking is indicated by a near constant modulus circle, and tight band on the plotted constant modulus circle. The tighter radial band on the plot of FIG. 3C, in comparison to FIG. 3E, reflects the difference in signal strength between the two input carrier signals, as well as the frequency dependent response of the low pass filters. It is noted that the plots exhibiting radial bands reflect those conditions in which coarse frequency locking has occurred. To provide even finer frequency locking, finer frequency adjustment techniques may be used to further increase the CMI value and produce an even tighter radial band on the plots.

Looking at the RSSI method for assessment, the RSSI values are highest for the two matched conditions of FIGS. 3C and 3E. However, the difference between the matched condition RSSI values and the unmatched condition RSSI values (FIGS. 3A, 3B, and 3D) are not sufficient to accurately indicate a match. On a log scale, the closest matched and unmatched values differ by approximately 15.53 dB (51.63–36.1 dB), which is actually less than the difference between the two matched values (21.69 dB=73.32–51.63 dB).

Figure 4A:
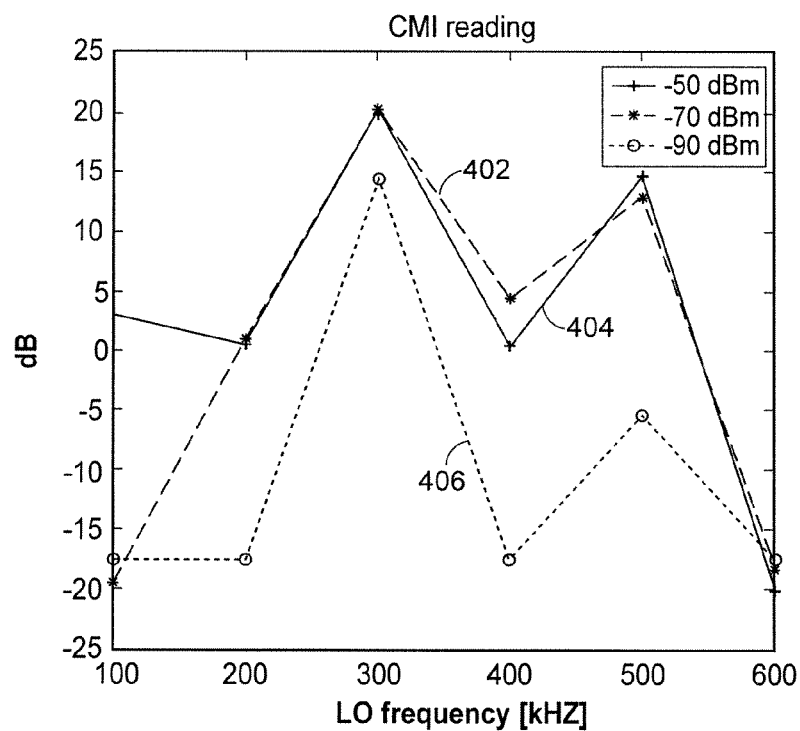
FIGS. 4A and 4B illustrates plots of the RF strength at different frequencies as determined by the constant modulus indication implementation of the system of FIG. 2 and as determined by an RSSI method, respectively.
Figure 4B:
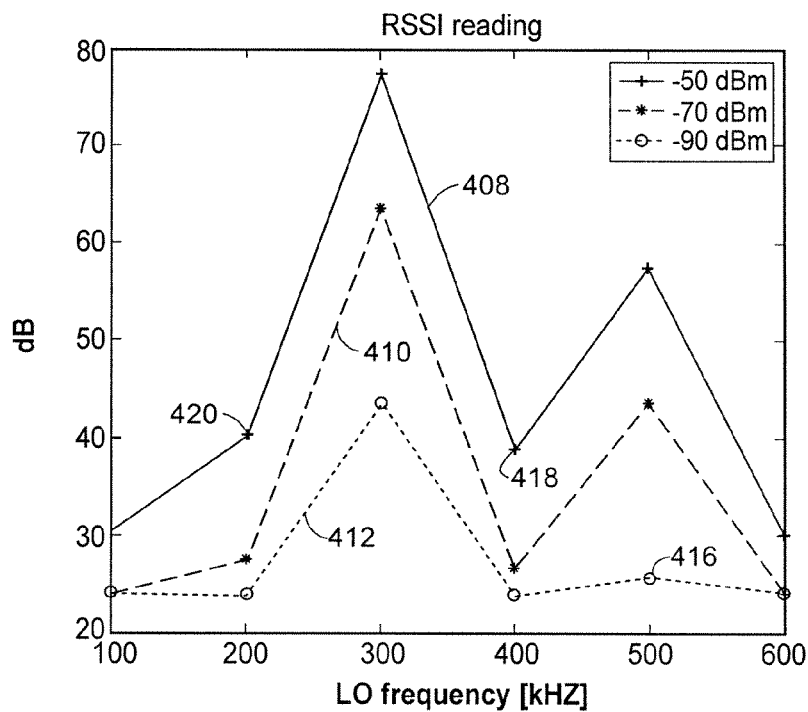

In contrast to RSSI, the CMI values determined by the circuit 200 are strong indicators of frequency matching between $F_{LO}$ and $F_C$, as illustrated by example in FIGS. 4A and 4B. FIG. 4A plots CMI values for different local oscillator frequencies ($F_{LO}$) in accordance with the example discussed above with respect to FIGS. 3A-3E. The CMI value is plotted (in dBs) for three different FM signal conditions, where the first signal (300 kHz) and second signal (500 kHz) have three different strength values, −50 dBm (402), −70 dBm (404), and −90 dBm (406). As shown, the CMI value for each of these different test conditions is above a 9.5 dB threshold value at the two frequency signals (300 kHz and 500 kHz) corresponding to the receive RF signal. All other $F_{LO}$ values fall below this threshold value. In contrast, FIG. 4B plots the RSSI (dBs) for each $F_{LO}$ frequency value for the same three different strength values on the incoming FM signal, −50 dBm (408), −70 dBm (410), and −90 dBm (412).

Unlike CMI, RSSI is heavily dependent upon the incoming signal strength, which makes threshold setting very difficult. The plot 412 for example has an RSSI level of approximately 42 dB (414) when $F_{LO}$ equals 300 kHz, for the incoming signal of strength −90 dBm. The plot 412 has an RSSI level of approximately 23.5 dB (416) when $F_{LO}$ equals 500 kHz, and this matched condition RSSI value is much lower than the unmatched condition RSSI values at points 418 and 420 for the incoming FM signal having a −50 dBm signal strength (408). Thus one could not set one threshold across all signal strengths and effectively use RSSI to identify for the channels within the received signal. Where in contrast, the CMI value may be readily used.

Figure 5A:
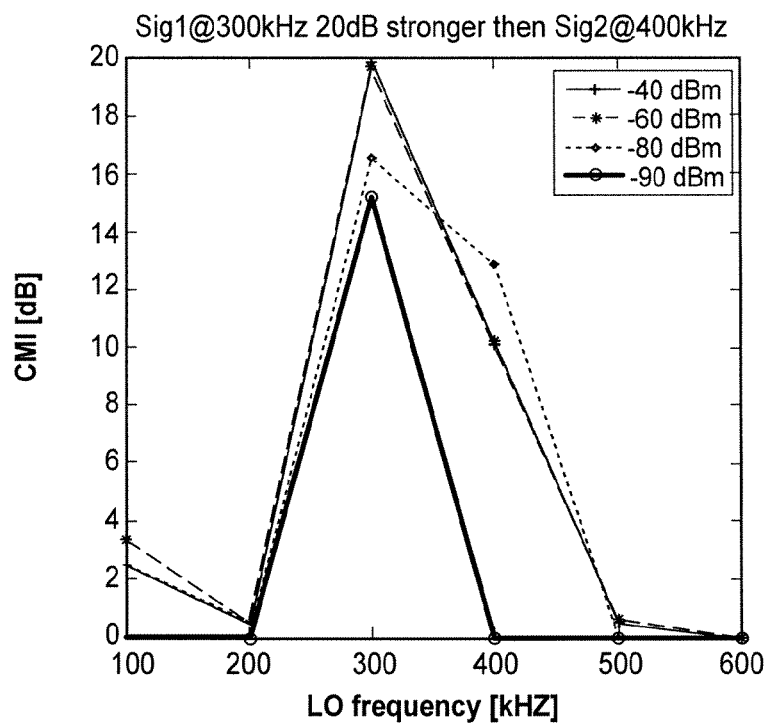
FIGS. 5A and 5B illustrates plots of the constant modulus indication (FIG. 5A) and the RSSI (FIG. 5B) versus local oscillator frequency similar to that of FIGS. 4A and 4B, but for an FM signal have different channels.
Figure 5B:
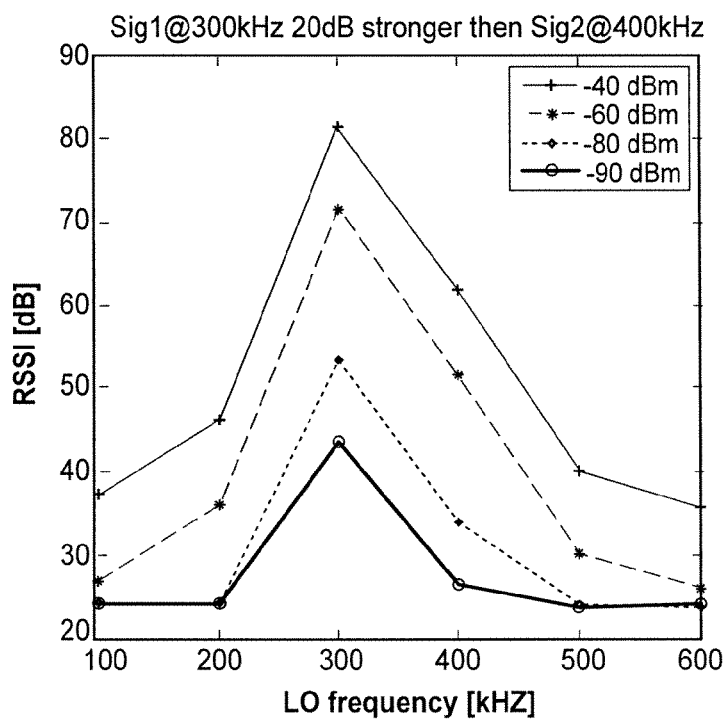

FIGS. 5A and 5B illustrate another example comparison of CMI against RSSI to identify frequency matching between the local oscillator and the incoming carrier signal frequencies of an FM signal. In the illustrated example, the FM signal includes two signals separated by only 100 kHz, a first signal at 300 kHz that is 20 dB stronger than a second signal at 400 kHz. Again, CMI is a better indicator of frequency matching over RSSI for identifying the 300 kHz signal. The 400 kHz signal is barely detectable with RSSI for FM signals having an input strength between −60 dBm, because the RSSI level at a matched condition of 400 kHz is below that of unmatched conditions at other frequencies for stronger signals. Using the CMI value determined by circuit 200, however, allows the system to identify the primary 300 kHz signal at any input power level and the secondary 400 kHz signal up to −80 dBm. In this example, CMI is bounded by a zero (0) value.

Figure 6A:
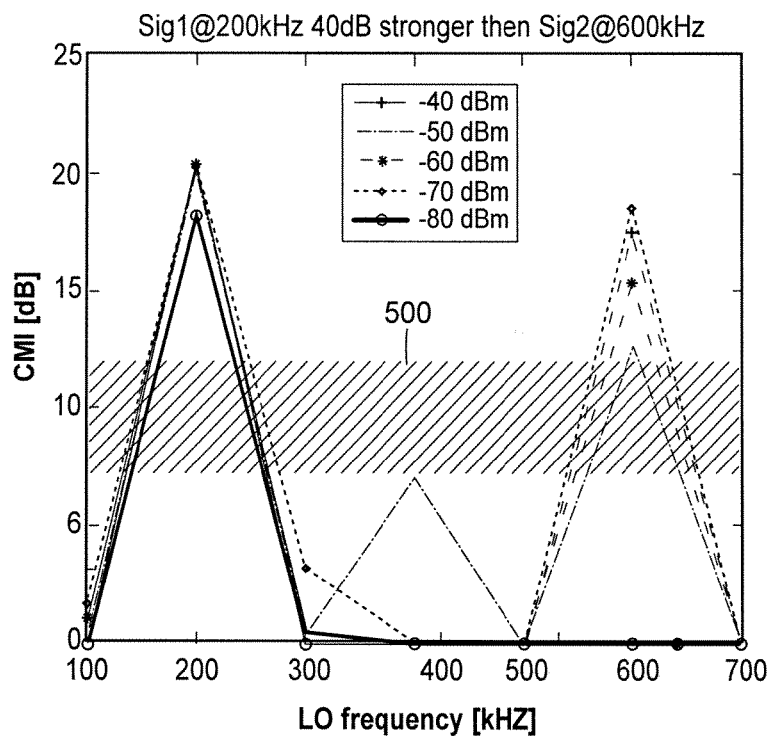
FIGS. 6A and 6B illustrates plots of the constant modulus indication (FIG. 6A) and the RSSI (FIG. 6B) versus local oscillator frequency similar to that of FIGS. 4A, 4B and FIGS. 5A and 5B, but for an FM signal have different channels.
Figure 6B:
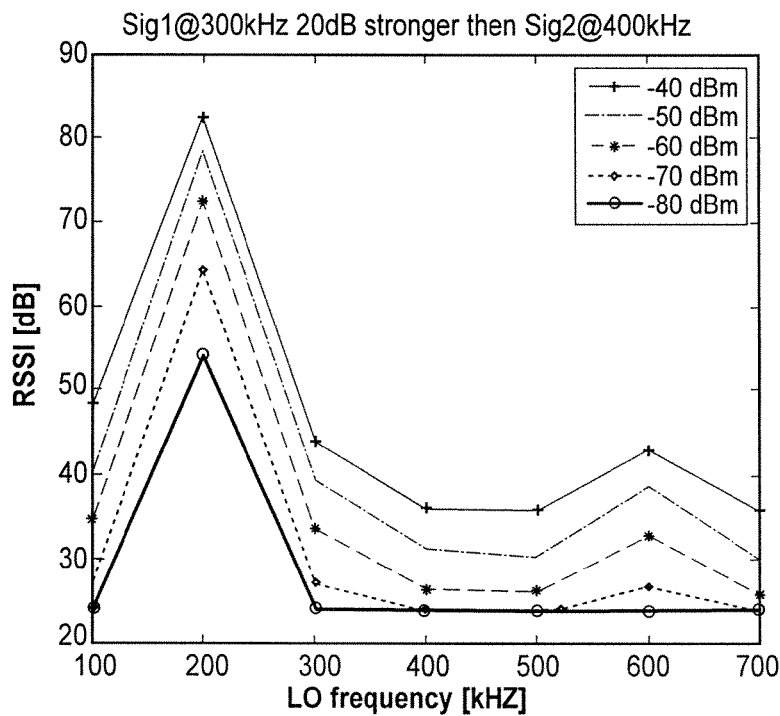

FIGS. 6A and 6B plot CMI against RSSI values for an FM signal having a first signal at 200 kHz and which is 40 dB stronger than a second signal at 600 kHz. As shown, CMI identifies both frequency signals and allows for a wide band 500 of acceptable threshold values, while no single threshold of the RSSI value would effectively detect both frequency signals across a range of input signal strengths.

Figure 7:
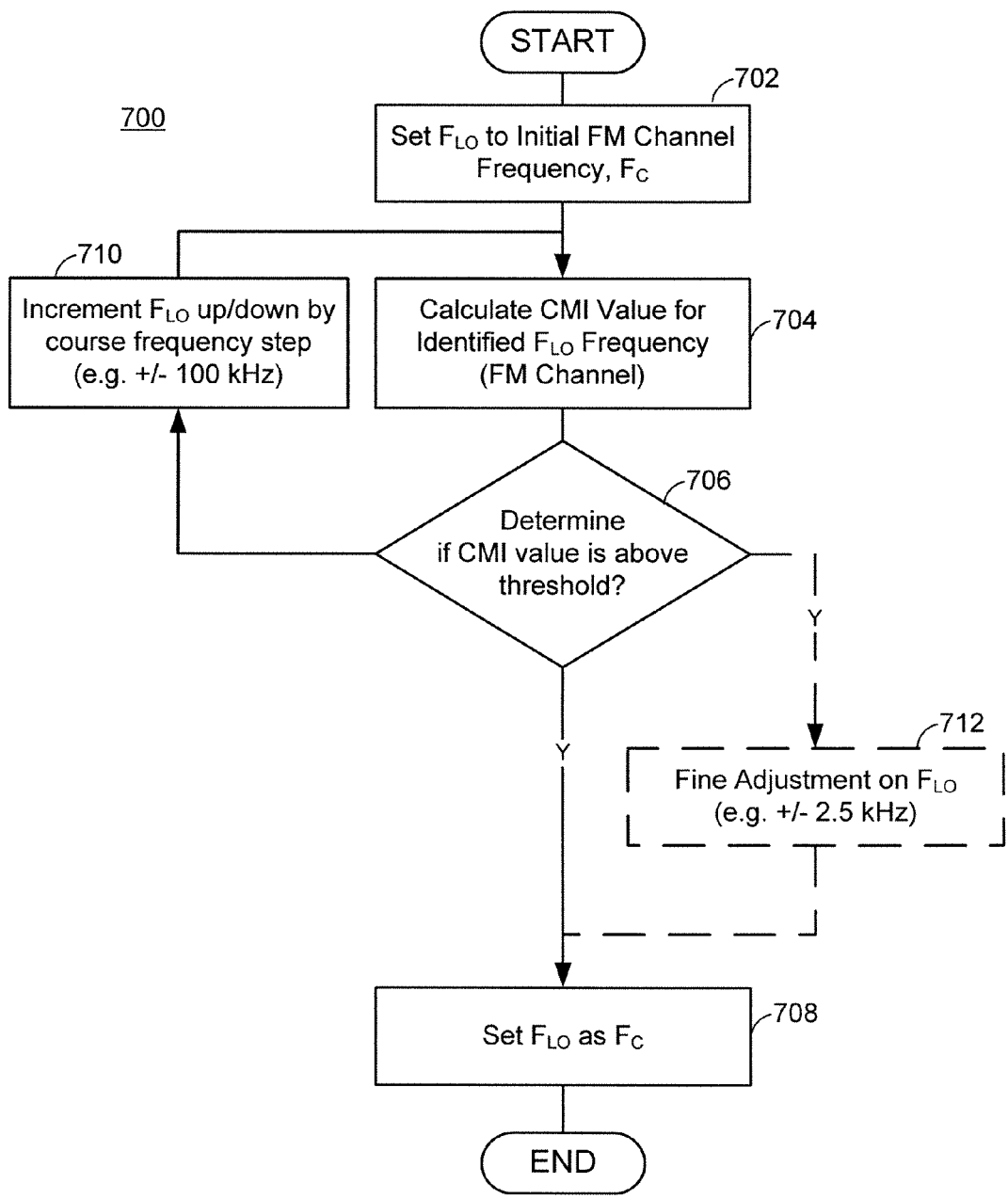
FIG. 7 is illustrates a flow diagram for determining the constant modulus indication as may be implemented by the system of FIG. 2.

FIG. 7 illustrates an example technique 700 for detecting an FM signal using CMI as may be implemented by the circuit 200. A block 702 sets a $F_{LO}$ to an initial carrier frequency to start the frequency detection process. In some examples, the incoming FM signal may be downshifted to a baseband signal in the filter 204 prior to mixing with $F_{LO}$. A block 704 calculates the CMI value for the identified channel frequency for $F_{LO}$, while block 706 determines if that CMI value is above a threshold, thereby indicating that the $F_{LO}$ is near or at a signal carrier frequency, $F_C$. If the CMI value is above the threshold then the $F_C$ signal has been detected, and a block 708 sets $F_{LO}$ as the $F_C$ for demodulation. If the CMI value is not above the threshold control passes back to block 708 which increments the $F_{LO}$ up or down by a discrete coarse frequency step that may correspond to the channel separation across the available FM signals in the baseband, for example, 100 kHz frequency step. The process then repeats with block 704 calculating the CMI value for the new frequency, until block 706 determines that the CMI value is above a threshold amount.

While in some examples the threshold is a threshold independent of the current $F_{LO}$, in other examples the threshold may be dynamically set and updated during run time. More generally, the threshold may vary depending on $F_{LO}$. In some examples of dynamic threshold setting, the technique 700 may identify RSSI or CMI values across all spectrum frequencies (multiple increment cycles) and from this determine a time average RSSI or CMI. The threshold may be set by increasing this time average by a static decibel level, for example.

In some examples, after the coarse adjustment described above, an optional block 712 may perform a fine adjustment for frequency locking. For example, the block 712 may calculate MDO for the FLO and FC, and adjustment FLO in small frequency increments +/−2.5 kHz) until MDO equals 0, thus further indicating a frequency lock. Thus the block 712 is one example way of optionally allowing for finer frequency adjustments to the coarse adjustments of blocks 704, 706, and 710.

In any event, each of the channels in an received RF signal may be identified using the CMI technique of FIG. 7, with the algorithm 700 being applied across the identified RF signal spectrum.

In this way, the techniques described herein are to provide a constant modulus indication that is designed to measure how close the FM signal scatters around a constant modulus circle. Comparisons between RSSI and CMI indicate that the CMI value determined herein is less sensitive to the signal strength, thereby allowing the system to readily determine a CMI threshold and use that threshold to identify weak (low RSSI) signals, even in the absence of nearby ACI's (adjacent channel interferers), and with low possibility of false-signal detection.

FIGS. 8A-8F, illustrate various devices in which a CMI-based RF receiver technique may be employed.

Figure 8A:
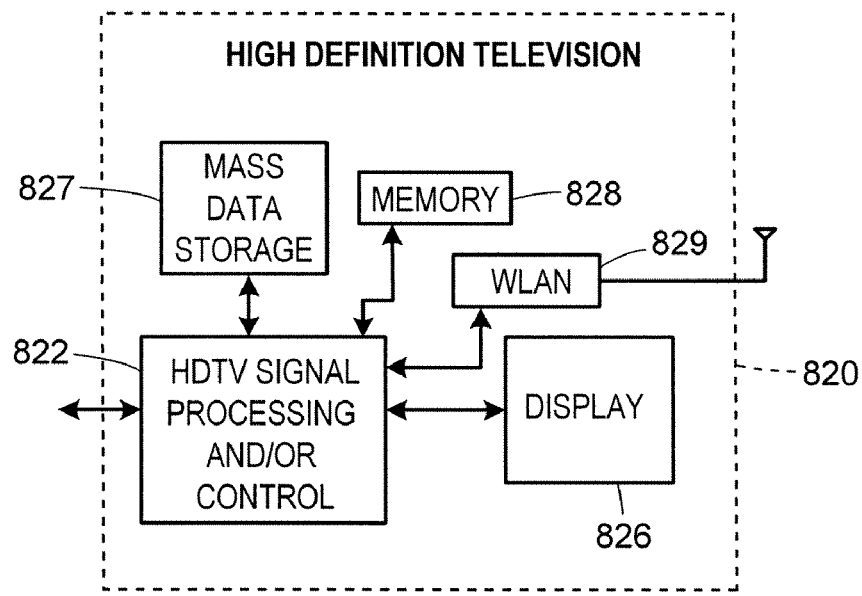
FIGS. 8A-8F illustrate embodiments of circuits that may incorporate a constant modulus indication circuit.

Referring now to FIG. 8A, such techniques may be utilized in a high definition television (HDTV) 820. HDTV 820 includes a mass data storage 827, an HDTV signal processing and control block 822, a WLAN interface and memory 828. HDTV 820 receives HDTV input signals in a wireless format and generates HDTV output signals for a display 826. In some implementations, signal processing circuit and/or control circuit 822 and/or other circuits (not shown) of HDTV 820 may process data, perform coding and/or encryption, perform calculations, format data and/or perform any other type of HDTV processing that may be required.

HDTV 820 may communicate with a mass data storage 827 that stores data in a nonvolatile manner such as optical and/or magnetic storage devices. The mass storage device may be a mini HDD that includes one or more platters having a diameter that is smaller than approximately 1.8". HDTV 820 may be connected to memory 828 such as RAM, ROM, low latency nonvolatile memory such as flash memory and/or other suitable electronic data storage. HDTV 820 also may support connections with a WLAN via a WLAN network interface 829. Both the HDTV signal processor 822 and the WLAN network interface 829 may include a digital front end and CMI determination circuitry or software to identify channels in an RF broadcast signal.

Figure 8B:
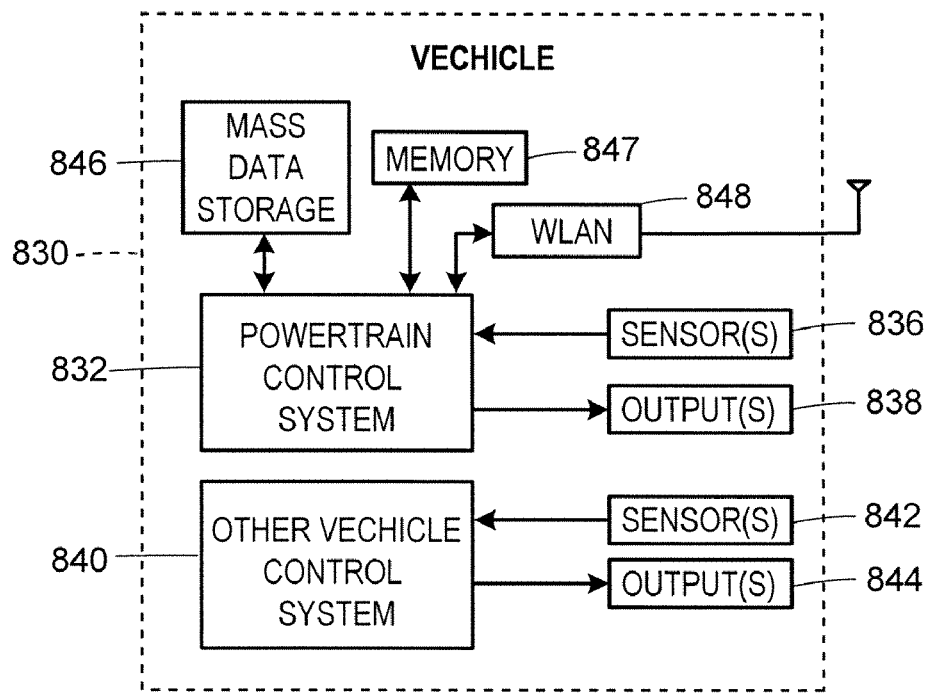

Referring now to FIG. 8B, such techniques may be utilized in a vehicle 830. The vehicle 830 includes a control system that may include mass data storage 846, as well as a WLAN interface 848. The mass data storage 846 may support a powertrain control system 832 that receives inputs from one or more sensors 836 such as temperature sensors, pressure sensors, rotational sensors, airflow sensors and/or any other suitable sensors and/or that generates one or more output control signals 838 such as engine operating parameters, transmission operating parameters, and/or other control signals.

Control system 840 may likewise receive signals from input sensors 842 and/or output control signals to one or more output devices 844. In some implementations, control system 840 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 832 may communicate with mass data storage 827 that stores data in a nonvolatile manner such as optical and/or magnetic storage devices. The mass storage device 846 may be a mini HDD that includes one or more platters having a diameter that is smaller than approximately 1.8". Powertrain control system 832 may be connected to memory 847 such as RAM, ROM, low latency nonvolatile memory such as flash memory and/or other suitable electronic data storage. Powertrain control system 832 also may support connections with a WLAN via a WLAN network interface 848. The control system 840 may also include mass data storage, memory and/or a WLAN interface (all not shown). In one exemplary embodiment, the WLAN network interface 848 may include a digital front end and CMI determination circuitry or software to identify channels in an RF broadcast signal.

Figure 8C:
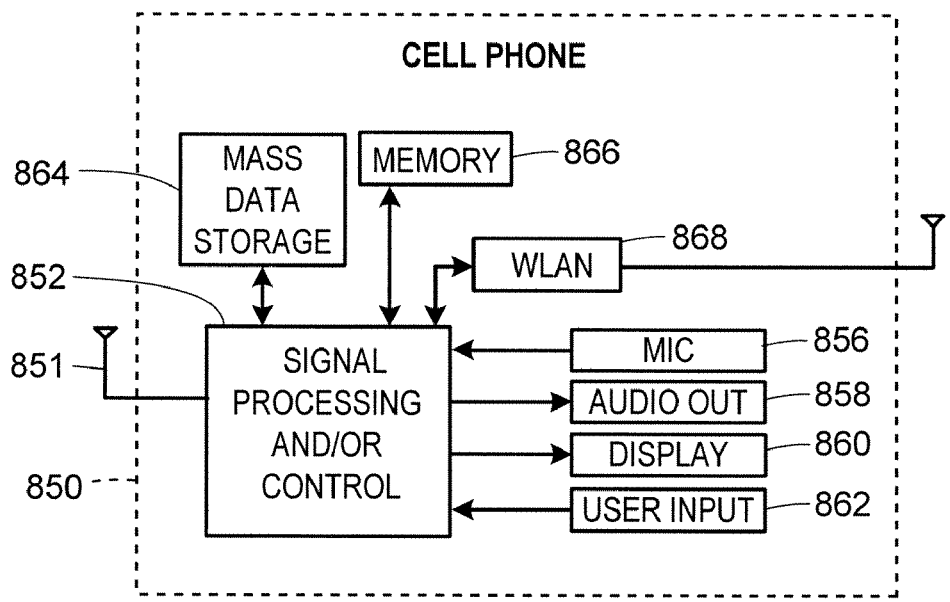

Referring now to FIG. 8C, such techniques may be used in a cellular phone 850 that may include a cellular antenna 851. The cellular phone 850 may include either or both signal processing and/or control circuits, which are generally identified in FIG. 8C at 852, a WLAN network interface 868 and/or mass data storage 864 of the cellular phone 850. In some implementations, cellular phone 850 includes a microphone 856, an audio output 858 such as a speaker and/or audio output jack, a display 860 and/or an input device 862 such as a keypad, pointing device, voice actuation and/or other input device. Signal processing and/or control circuits 852 and/or other circuits (not shown) in cellular phone 850 may process data, perform coding and/or encryption, perform calculations, format data and/or perform other cellular phone functions.

Cellular phone 850 may communicate with mass data storage 864 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 850 may be connected to memory 866 such as RAM, ROM, low latency nonvolatile memory such as flash memory and/or other suitable electronic data storage. Cellular phone 850 also may support connections with a WLAN via a WLAN network interface 868 that may include a digital front end and CMI determination circuitry or software to identify channels in an RF broadcast signal.

Figure 8D:
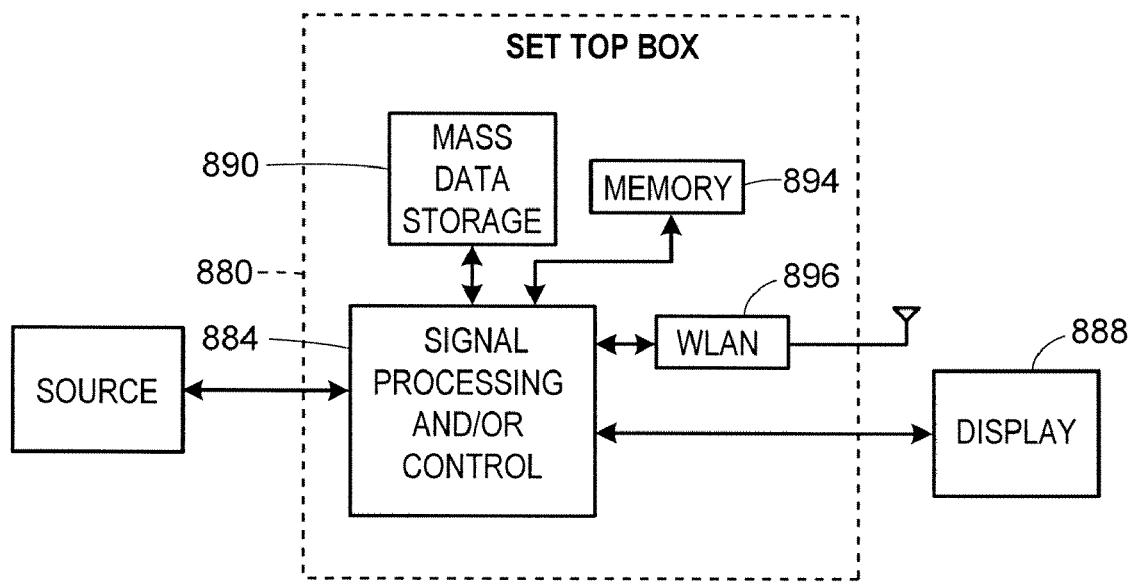

Referring now to FIG. 8D, such techniques may be utilized in a set top box 880. The set top box 880 may include either or both signal processing and/or control circuits, which are generally identified in FIG. 8D at 884, a WLAN interface and/or mass data storage 890 of the set top box 880. Set top box 880 receives signals from a source such as a broadband source and outputs standard and/or high definition audio/video signals suitable for a display 888 such as a television and/or monitor and/or other video and/or audio output devices. Signal processing and/or control circuits 884 and/or other circuits (not shown) of the set top box 880 may process data, perform coding and/or encryption, perform calculations, format data and/or perform any other set top box function.

Set top box 880 may communicate with mass data storage 890 that stores data in a nonvolatile manner and may use jitter measurement. Mass data storage 890 may include optical and/or magnetic storage devices for example hard disk drives HDD and/or DVDs. The HDD may be a mini HDD that includes one or more platters having a diameter that is smaller than approximately 1.8". Set top box 880 may be connected to memory 894 such as RAM, ROM, low latency nonvolatile memory such as flash memory and/or other suitable electronic data storage. Set top box 880 also may support connections with a WLAN via a WLAN network interface 896. The WLAN network interface 896 may include a digital front end and CMI determination circuitry or software to identify channels in an RF broadcast signal.

Figure 8E:
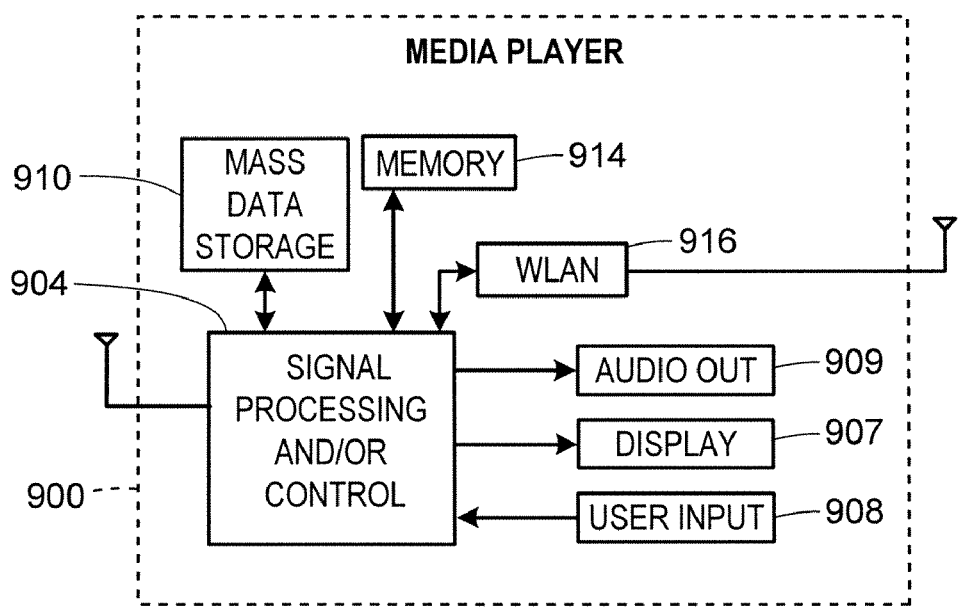

Referring now to FIG. 8E, such techniques may be used in a media player 900. The media player 900 may include either or both signal processing and/or control circuits, which are generally identified in FIG. 8E at 904, a WLAN interface and/or mass data storage 910 of the media player 900. In some implementations, media player 900 includes a display 907 and/or a user input 908 such as a keypad, touchpad and the like. In some implementations, media player 900 may employ a graphical user interface (GUI) that typically employs menus, drop down menus, icons and/or a point-and-click interface via display 907 and/or user input 908. Media player 900 further includes an audio output 909 such as a speaker and/or audio output jack. Signal processing and/or control circuits 904 and/or other circuits (not shown) of media player 900 may process data, perform coding and/or encryption, perform calculations, format data and/or perform any other media player function.

Media player 900 may communicate with mass data storage 910 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 900 may be connected to memory 914 such as RAM, ROM, low latency nonvolatile memory such as flash memory and/or other suitable electronic data storage. Media player 900 also may support connections with a WLAN via a WLAN network interface 916. The WLAN network interface 916 and/or signal processing circuits 904 may include a digital front end and CMI determination circuitry or software to identify channels in an RF broadcast signal.

Figure 8F:
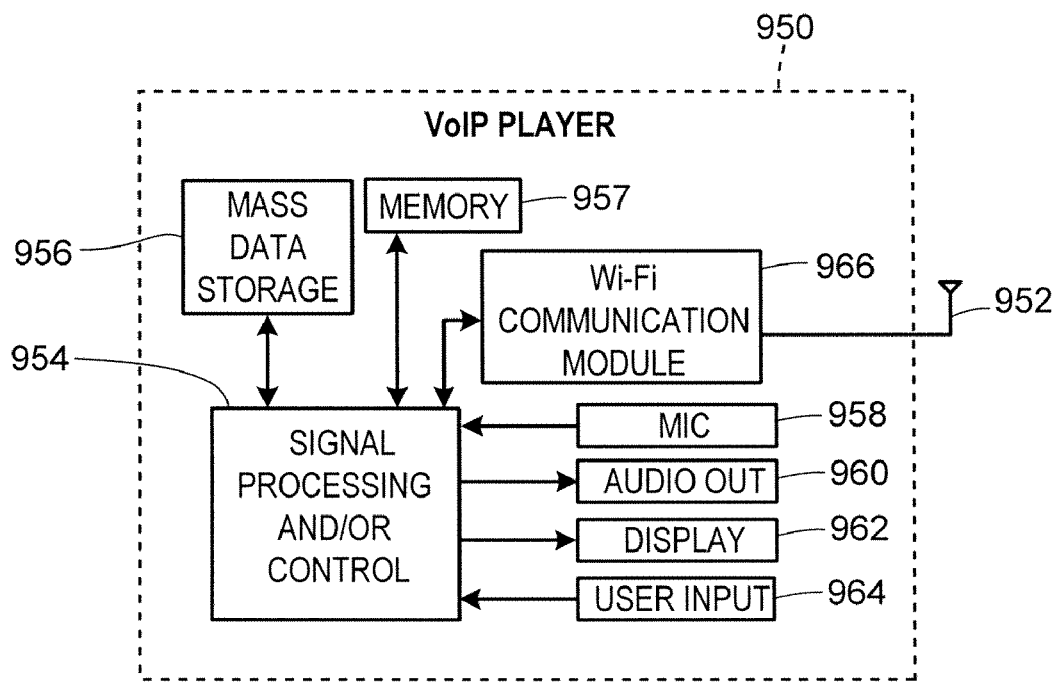

Referring to FIG. 8F, such techniques may be utilized in a Voice over Internet Protocol (VoIP) phone 950 that may include an antenna 952. The VoIP phone 950 may include either or both signal processing and/or control circuits, which are generally identified in FIG. 8F at 954, a wireless interface and/or mass data storage of the VoIP phone 950. In some implementations, VoIP phone 950 includes, in part, a microphone 958, an audio output 960 such as a speaker and/or audio output jack, a display monitor 962, an input device 964 such as a keypad. pointing device, voice actuation and/or other input devices, and a Wireless Fidelity (WiFi) communication module 966. Signal processing and/or control circuits 954 and/or other circuits (not shown) in VoIP phone 950 may process data, perform coding and/or encryption, perform calculations, format data and/or perform other VoIP phone functions.

VoIP phone 950 may communicate with mass data storage 956 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 950 may be connected to memory 957, which may be a RAM, ROM, low latency nonvolatile memory such as flash memory and/or other suitable electronic data storage. VoIP phone 950 is configured to establish communications link with a VoIP network (not shown) via WiFi communication module 966. The WiFi communication module 966 include a digital front end and CMI determination circuitry or software to identify channels in an RF broadcast signal for use in communicating data via the WiFi communication module 966 or via the audio output 960 in communication with an accessory, such as a Bluetooth headset (not depicted).

Figure 1:
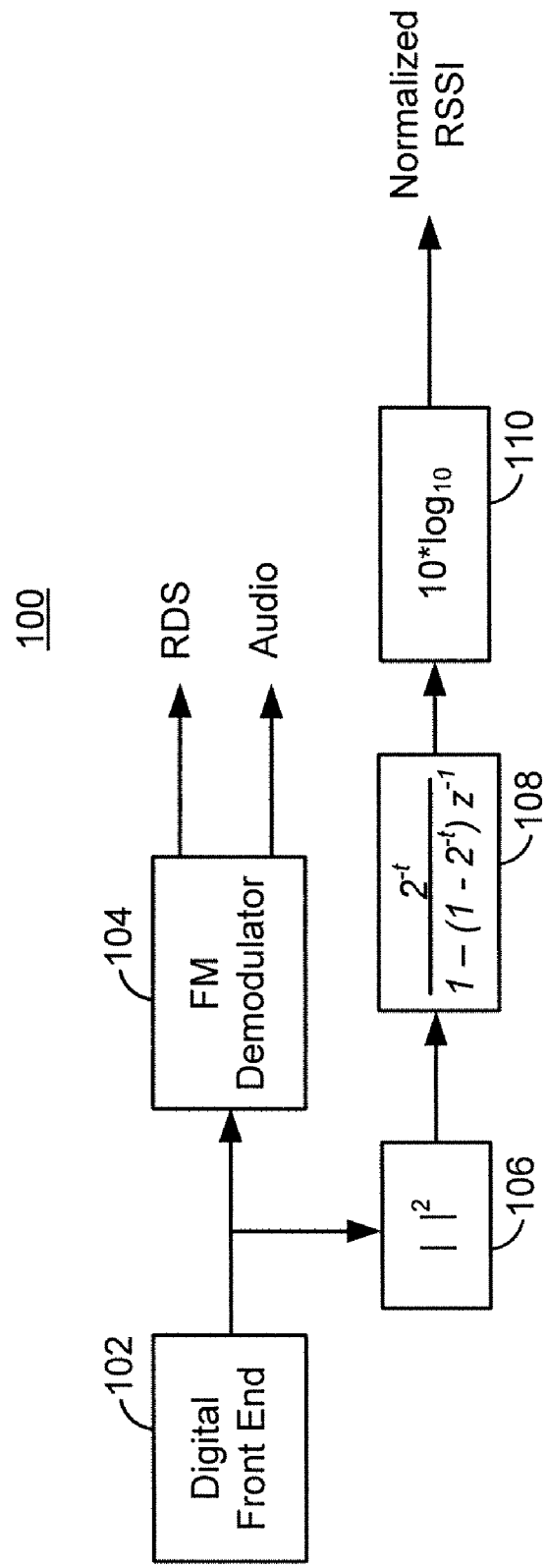
FIG. 1 illustrates a block diagram illustrating a prior art system of decoding an FM signal.
Figure 9:
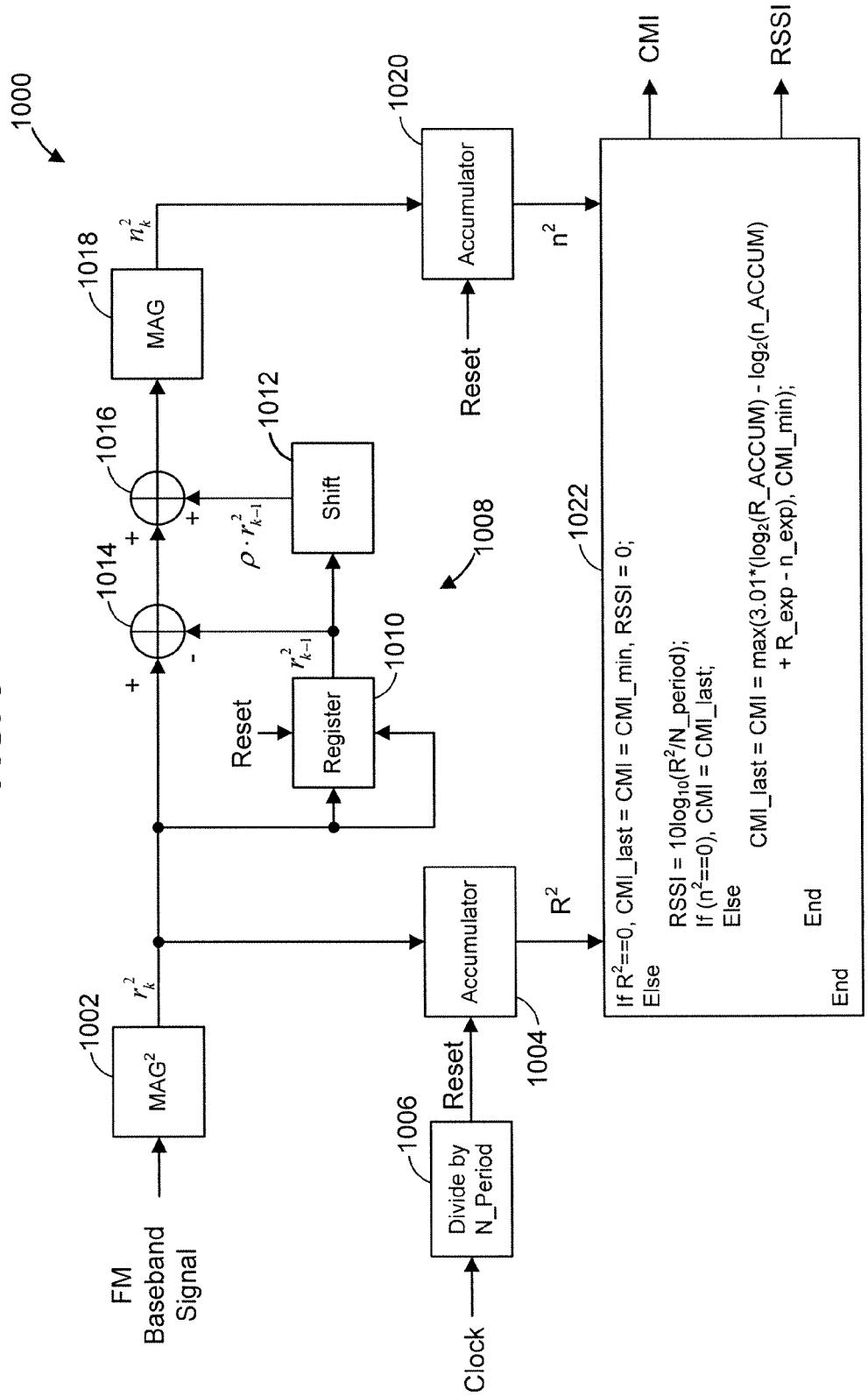
FIG. 9 is a block diagram of an example constant modulus indication/Received Signal Strength Indicator calculator that may be utilized with the receiver of FIG. 1.

FIG. 9 is a block diagram of an example CMI/RSSI calculator 1000 that may be utilized as a CMI/RSSI calculator in place of elements 106, 108 and 110 of FIG. 1 or the element 213 of FIG. 2. For example, the CMI/RSSI calculator 1000 may receive an FM baseband signal directly from the Digital Front End 102 or from the Digital Front End 212, or alternatively from the LPF 214 of FIG. 2. Additionally, the CMI/RSSI calculator 1000 may be utilized in systems other than the example receiver 100 of FIG. 1 or the example receiver 200 of FIG. 2.

The CMI/RSSI calculator 1000 includes a magnitude-squared calculator 1002 that receives an FM baseband signal. The magnitude-squared calculator 1002 calculates the squared magnitude of the FM baseband signal, and the output of the magnitude-squared calculator 1002 is provided to a block accumulator 1004. The block accumulator 1004 accumulates the output of the magnitude-squared calculator 1002 ($r_k^2$) over a block of samples to generate an $R^2$ signal, which generally is a measure of the FM signal energy. A clock divider 1006 receives a clock, which corresponds to the FM baseband signal, and divides the clock so that a reset signal pulse is generated once per block of samples. The reset signal is provided to the block accumulator 1004.

The output of the magnitude-squared calculator 1002 is also coupled to a signal energy prediction generator 1008. Generally, the signal energy prediction generator 1008 generates a prediction of the output of the magnitude-squared calculator 1002 based on the previous output of the magnitude-squared calculator 1002 according to:

$$\tilde{r}_k^2 = (1-\rho) r_{k-1}^2 \quad \text{(Equation 5)}$$

where $\tilde{r}_k^2$ is the prediction of the output of the magnitude-squared calculator 1002 (measure of signal energy), and $r_{k-1}^2$ is the previous output of the magnitude-squared calculator 1002. The prediction of the signal energy may be used to calculate a measure of the noise energy. For example, the noise energy $n_k^2$ may be calculated based on the difference between the signal energy and the prediction:

$$n_k^2 = |r_k^2 - \tilde{r}_k^2| = |r_k^2 - (1-\rho) r_{k-1}^2| = |(r_k^2 - r_{k-1}^2) + \rho \cdot r_{k-1}^2| \quad \text{(Equation 6)}$$

where $\rho$ is a parameter that is near zero. The energy prediction generator 1008 may be integrated with generation of the noise energy $n_k^2$ so that explicit calculation of $(1-\rho) r_{k-1}^2$. For example, the prediction of the signal energy may be integrated with the calculation of $n_k^2 = |(r_k^2 - r_{k-1}^2) + \rho \cdot r_{k-1}^2|$.

The energy prediction generator 1008 includes a register 1010 that delays the output of the magnitude-squared calculator 1002. In particular, the register 1010 includes a data input coupled to the output of the magnitude-squared calculator 1002. The register 1010 also includes a reset had input for loading a value into the register upon activation of the reset signal. The reset load input also may be coupled to the output of the magnitude-squared calculator 1002. An output of the register 1010 is provided to a right-shifting device 1012 that implements the multiplication $\rho \cdot r_{k-1}^2$. The output of the register 1010 is also provided to a subtractor 1014. The output of the magnitude-squared calculator 1002 is also provided to the subtractor 1014, and the subtractor 1014 implements a calculation corresponding to $r_k^2 - r_{k-1}^2$. An output of the subtractor 1014 is coupled to an input of an adder 1016. Another input of the adder is coupled to an output of the right-shifting device 1012, and the adder 1016 implements a calculation corresponding to $(r_k^2 - r_{k-1}^2) + \rho \cdot r_{k-1}^2$. An output of the adder 1016 is coupled to a magnitude calculator 1018. The magnitude calculator 1018 calculates the magnitude of the output of the adder 1016 and generates an output corresponding to the result of Equation 6.

The output of the magnitude calculator 1018 is provided to a block accumulator 1020. The block accumulator 1020 accumulates the output of the magnitude calculator 1018 over the block of samples to generate an $n^2$ signal, which generally is a measure of the noise energy.

The outputs of the block accumulator 1004 and the block accumulator 1020 are coupled to a computational block 1022 that generates a CMI signal and, optionally, an RSSI signal based on the $R^2$ signal and the $n^2$ signal. In particular, CMI is generally calculated according to:

$$CMI = CMI\_min, \text{ if } R^2 = 0; \quad \text{(Equation 7)}$$

$$CMI = CMI\_last, \text{ if } R^2 \neq 0 \text{ and } n^2 = 0; \quad \text{(Equation 8)}$$

otherwise CMI is expressed in Equation 9 as, $$CMI = max(3.01*(\log_2(R\_ACCUM) - \log_2(n\_ACCUM) + R\_exp - n\_exp), CMI\_min)$$

where CMI_min is a chosen minimum allowable value of CMI, and CMI_last is the previous value of CMI. The value of CMI_min may be chosen based on the particular implementation. R_ACCUM and n_ACCUM represent the R and N portions of the ACCUM signal from the accumulator of FIG. 10. R_exp and n_exp represent the R and N exp bit values.

If the computational block 1022 also generates an RSSI signal, the RSSI signal may be generally calculated according to:

$$RSSI = 0, \text{ if } R^2 = 0; \quad \text{(Equation 10)}$$

otherwise, $$RSSI = 10 \log_{10}(R^2 / N\_period) \quad \text{(Equation 11)}$$

where expressing $R^2$ in terms of ACCUM (FIG. 10) and exp, i.e., $R^2 = ACCUM*(1 << exp)$, the expression becomes $$RSSI = 3.01*(\log_2(ACCUM) + exp - \log_2(N\_period)) \quad \text{(Equation 12)}$$

where N_period is the number baseband samples in the block over which the $R^2$ signal and the $n^2$ signal are calculated.

The computational block 1022 may be implemented in hardware, software, firmware, or some combination of hardware, software, and/or firmware. For example, the computational block 1022 may comprise a logic circuit. As another example, the computational block 1022 may be implemented by a processor coupled to a memory that stores computer readable instructions to be executed by the processor. More generally, the example CMI/RSSI calculator 1000 may be implemented in hardware, software, firmware, or some combination of hardware, software, and/or firmware. For instance, each block in the CMI/RSSI calculator 1000 may comprise a logic circuit, or may be implemented by a processor coupled to a memory that stores computer readable instructions to be executed by the processor.

Figure 10:
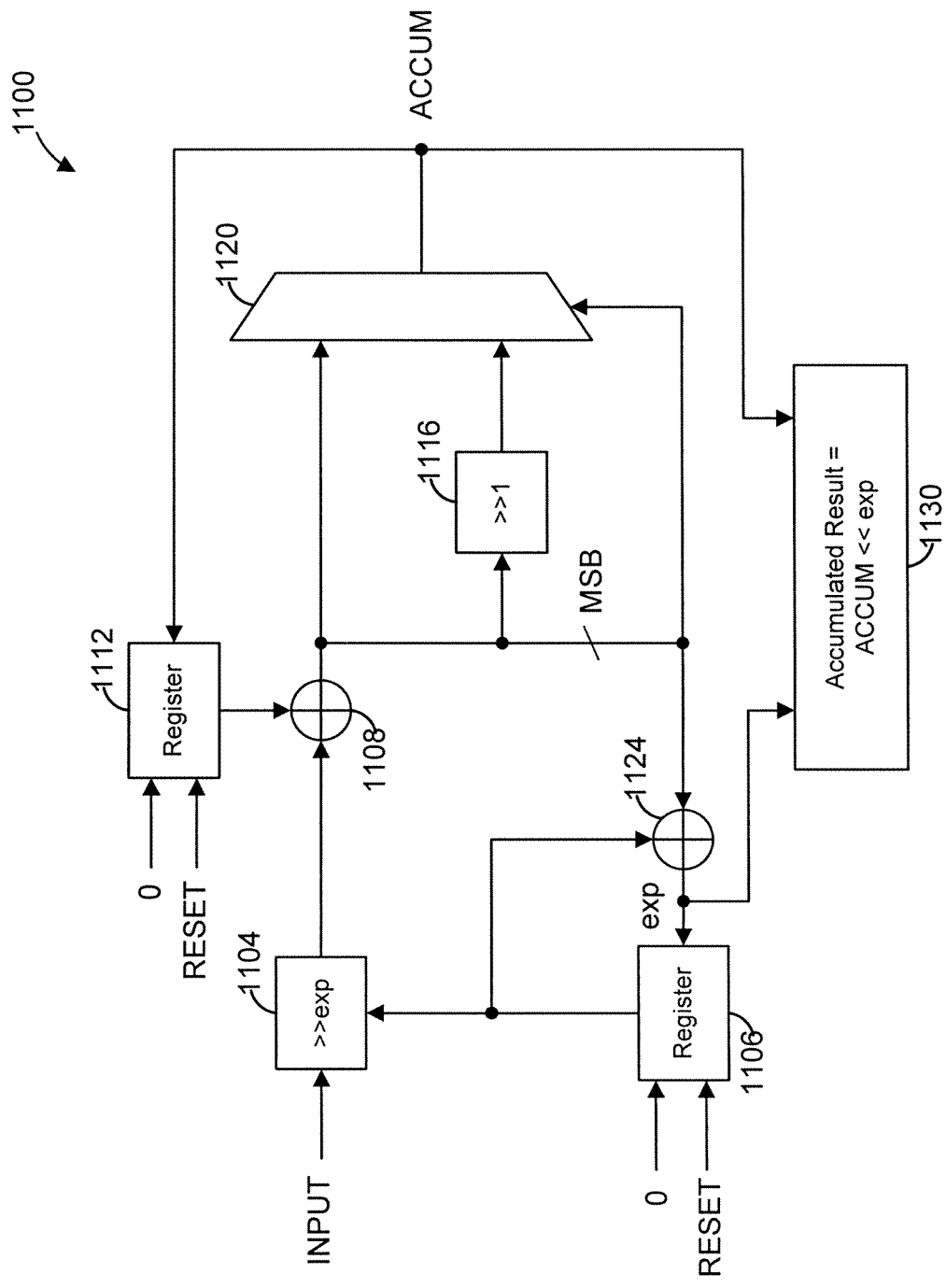
FIG. 10 is a block diagram of an example accumulator that may be utilized with the constant modulus indication/Received Signal Strength Indicator calculator of FIG. 9.

FIG. 10 is a block diagram of an example accumulator 200 that may be utilized as the accumulator 1004 and/or the accumulator 1020 of FIG. 9. It will be understood, however, that the accumulator 1004 and/or the accumulator 1020 of FIG. 9 may be different than the accumulator 200 of FIG. 10.

The accumulator 1100 includes a right-shifting device 1104 that receives as an input data input to the accumulator 1100. The right-shifting device 1104 generates an output that corresponds to the data input right-shifted by exp bits, where exp is a positive integer received from a register 1106 coupled to the right-shifting device 1104. An output of the right-shifting device 1104 is coupled to an input of an adder 1108. Another input of the adder 1108 is coupled to an output of a register 1112, which may store a previous accumulation result (ACCUM).

An output of the adder 1108 is coupled to a right-shifting device 1116, which right-shifts the output of the adder 1108 by one bit. The output of the adder 1108 and an output of the right-shifting device 1116 are coupled to data inputs of a multiplexer 1120. Additionally, the most significant bit (MSB) of the output of the adder 1108 is coupled to a control input of the multiplexer 1120. If the MSB is zero, the output of the adder 1108 is selected, and if the MSB is one, the output of the right shifting device 1116 is selected. An output of the multiplexer 1120 is coupled to an input of the register 1112.

The MSB is also coupled to an input of an adder 1124. Another input of the adder 1124 is coupled to the output of the register 1106. Thus, when the MSB is one, the value exp is incremented and stored in the register 1106. If the MSB is zero, the value exp stored in the register 1106 remains unchanged. Each of the registers 1106 and 1112 has a reset load input coupled to a zero value, so that when the reset signal is activated, the value zero is loaded into each of the registers 1106 and 1112.

A left-shifting device 1130 is coupled to the output of the multiplexer 1120 and the output of the adder 1124. The left-shifting device 1130 left-shifts the output of the multiplexer 1120 by exp bits. Typically, the left-shifting device 1130 will have a wider width than the output of the multiplexer 1120.

In operation, the accumulator 1100 generally accumulates energy values. When the MSB of the next accumulation result (ACCUM) becomes one, the accumulation result is essentially right-shifted by one bit. Additionally, the following energy values will also be right-shifted by one bit. This may be repeated and the value exp may continue to increment. At the end of the block, the result may then be left shifted by exp bits.

Figure 11:
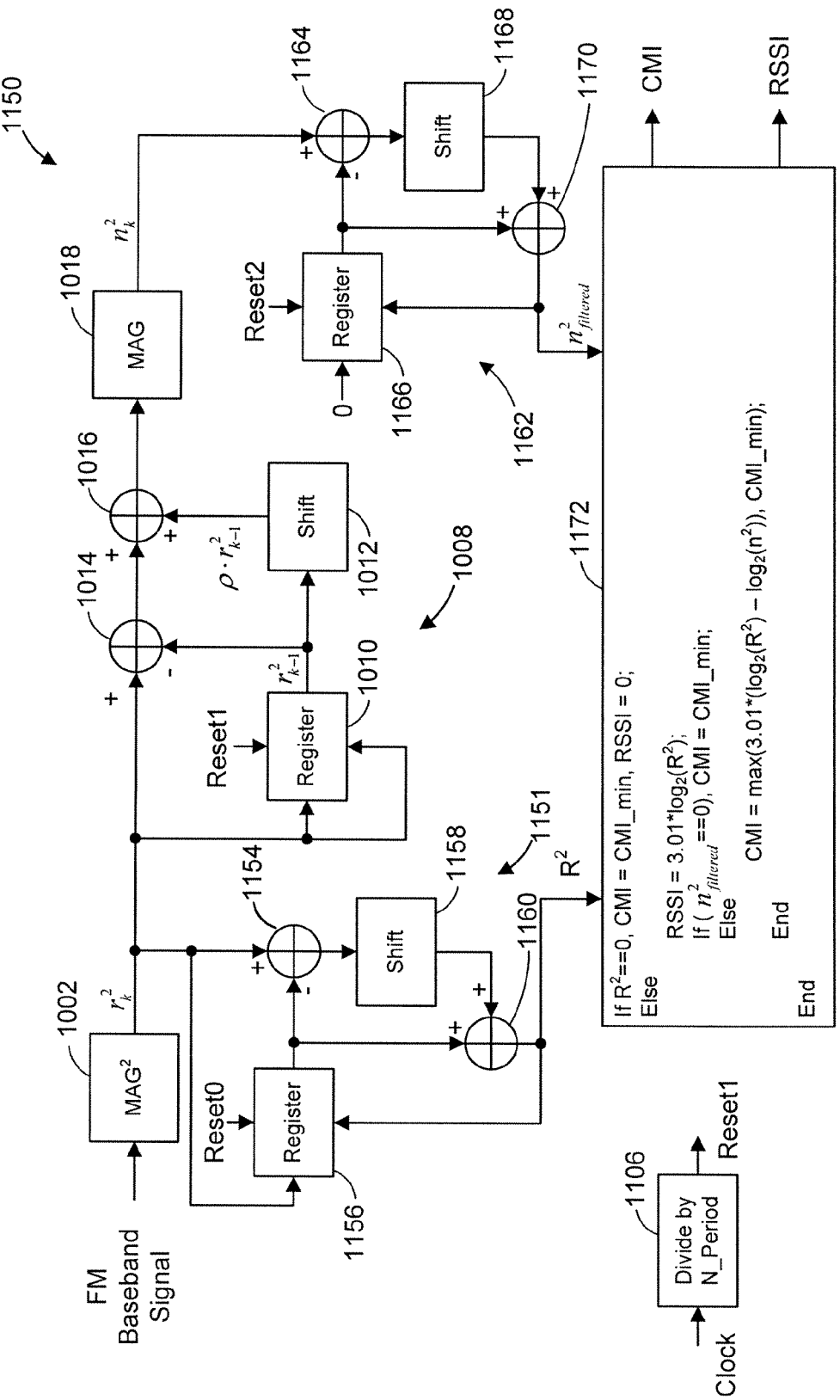
FIG. 11 is a block diagram of another example constant modulus indication/Received Signal Strength Indicator calculator that may be utilized with the receiver of FIG. 1.

FIG. 11 is a block diagram of another example CMI/RSSI calculator 1150 that may be utilized as the CMI/RSSI calculator in place of elements 106, 108 and 110 of FIG. 1 or element 213 of FIG. 2. For example, the CMI/RSSI calculator 1150 may receive an FM baseband signal directly from the Digital Front End 102 or from the Digital Front End 212, or alternatively from the LPF 214 of FIG. 2. Additionally, the CMI/RSSI calculator 1150 may be utilized in systems other than the example receiver 100 of FIG. 1 of the example receiver 200 of FIG. 2.

The CMI/RSSI calculator 1150 includes a magnitude-squared calculator 1002 that receives an FM baseband signal that may be same as or similar to the magnitude-squared calculator 1002 of FIG. 9. The magnitude-squared calculator 1002 calculates the squared magnitude of the FM baseband signal, and the output of the magnitude-squared calculator 1002 is provided to an infinite impulse response (IIR) filter 1152, which generally may be a low-pass filter. The filter 1152 filters the output of the magnitude-squared calculator 1002 to generate an $R^2$ signal, which generally is a measure of the FM signal energy.

The filter 1152 may include a subtractor 1154 having an input coupled to an output of the magnitude-squared calculator 1002. Another input of the subtractor 1154 is coupled to an output of a register 1156 that stores a previous value of the $R^2$ signal. An output of the subtractor 1154 is coupled to an input of a right-shifting device 1158, which right-shifts by a number of bits est_time0. An output of the right-shifting device 1158 is coupled to an input of an adder 1160. Another input of the adder 1160 is coupled to the output of the register 1156. An output of the adder 1160 is coupled to an input of the register 1156. The register 1156 also includes a reset load input for loading a value into the register 1156 upon activation of the reset signal. The reset load input also may be coupled to the output of the magnitude-squared calculator 1002.

The output of the adder 1160 is the signal $R^2$, which is generated according to:

$$R_k^2 R_{k-1}^2 + \alpha_R(r_k^2 - R_{k-1}^2) = \alpha_R r_k^2 + (1-\alpha_R)R_{k-1}^2 \quad \text{(Equation 13)}$$

where $\alpha_R$ is a parameter corresponding to a right-shift device 1158 by est_time0 bits. Generally, for smaller values of $\alpha_R$ (i.e., more right-shifts), the signal $R^2$ will adjust more rapidly, whereas for larger values of $\alpha_R$ (i.e., less right-shifts), the signal $R^2$ will adjust less rapidly, but will be more accurate. Selection of a particular value $\alpha_R$ may vary depending on the particular implementation.

The output of the magnitude-squared calculator 1002 is also coupled to a signal energy prediction generator 1008, which may be the same as or similar to the signal energy prediction generator 1008 of FIG. 9. A magnitude calculator 1018, which may be the same as or similar to the magnitude calculator 1018 of FIG. 9, calculates the magnitude of the output of the adder 1016 and generates an output corresponding to the result of Equation 6.

The output of the magnitude calculator 1018 is provided to an IIR filter 1162, which generally may be a low-pass filter. The filter 1162 filters the output of the magnitude calculator 1018 to generate an $n_{filtered}^2$ signal, which generally is a measure of the noise energy.

The filter 1162 may include a subtractor 1164 having an input coupled to an output of the magnitude calculator 1018. Another input of the subtractor 1164 is coupled to an output of a register 1166 that stores a previous value of the $n_{filtered}^2$ signal. An output of the subtractor 1164 is coupled to an input of a right-shifting device 1168, which right-shifts by a number of bits est_time2. An output of the right-shifting device 1168 is coupled to an input of an adder 1170. Another input of the adder 1170 is coupled to the output of the register 1166. An output of the adder 1170 is coupled to an input of the register 1166. The register 1166 also includes a reset load input for loading a value into the register 1166 upon activation of the reset signal. The reset load input also may be coupled to a zero value.

The output of the adder 1170 is the signal $n_{filtered}^2$ which is generated according to:

22

$$n_{filtered,k}^2 = n_{filtered,k-1}^2 + \alpha_n(n_k^2 - n_{filtered,k-1}^2) = \alpha_n n_k^2 + (1-\alpha_n)n_{filtered,k-1}^2 \quad \text{(Equation 14)}$$

where $\alpha_n$ is a parameter corresponding to a right-shift device 1168 by est_time2 bits. Generally, for smaller values of $\alpha_n$ (i.e., more right-shifts), the signal $n_{filtered}^2$ will adjust more rapidly, whereas for larger values of $\alpha_n$ (i.e., less right-shifts), the signal $n_{filtered}^2$ will adjust less rapidly, but will be more accurate. Selection of a particular value $\alpha_n$ may vary depending on the particular implementation.

The outputs of the filter 1151 and the filter 1162 are coupled to a computational block 1172 that generates a CMI signal and, optionally, an RSSI signal based on the $R^2$ signal and the $n_{filtered}^2$ signal. In particular, CMI is generally calculated according to Equation 4 and $$\text{CMI=CMI\_min, if } R^2 \neq 0 \text{ and } n_{filtered}^2 = 0; \quad \text{(Equation 15)}$$

$$CMI = \max(3.01*(\log_2(R^2) - \log_2(n^2)), CMI\_min), \text{ if } R^2 \neq 0 \text{ and } n_{filtered}^2 \neq 0 \quad \text{(Equation 16)}$$

If the computational block 1172 also generates an RSSI signal, the RSSI signal may be generally calculated according to Equation 10 and:

$$RSSI = 3.01*\log_2(R^2), \text{ if } R^2 \neq 0, \quad \text{(Equation 17)}$$

The computational block 1172 may be implemented in hardware, software, firmware, or some combination of hardware, software, and/or firmware. For example, the computational block 1172 may comprise a logic circuit. As another example, the computational block 1172 may be implemented by a processor coupled to a memory that stores computer readable instructions to be executed by the processor. More generally, the example CMI/RSSI calculator 1150 may be implemented in hardware, software, firmware, or some combination of hardware, software, and/or firmware. For instance, each block in the CMI/RSSI calculator 1150 may comprise a logic circuit, or may be implemented by a processor coupled to a memory that stores computer readable instructions to be executed by the processor.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for detecting a radio frequency (RF) signal in a receiver, the RF signal having at least one narrowband channel within a wideband spectrum for the RF signal, the method comprising:
   mixing a local oscillator signal from a local oscillator of the receiver with the RF signal to produce a mixed signal, wherein the local oscillator signal has a frequency at a first channel frequency;
   converting the mixed signal to a digital mixed signal;
   in a digital front end, determining an RF channel signal from the digital mixed signal;
   determining a magnitude of a constant modulus signal for the RF channel signal;
   determining a magnitude of a noise signal of the RF channel signal; and
   comparing the magnitude of the constant modulus signal with the magnitude of the noise signal to produce a constant modulus indication value indicating a ratio of the magnitude of the constant modulus signal to the magnitude of the noise signal.

2. The method of claim 1, further comprising:
   determining whether the constant modulus signal is above a threshold value; and
   if the constant modulus signal is not above the threshold value, incrementing the local oscillator signal from the first channel frequency, to a second channel frequency.

3. The method of claim 2, further comprising incrementing the local oscillator signal by an amount equal to a channel spacing frequency.

4. The method of claim 2, further comprising:
   determining an MPX DC offset (MDO) signal for the RF channel signal; and
   incrementing the frequency of the local oscillator signal by a coarse frequency amount until the MDO signal exhibits a transition about a zero value.

5. The method of claim 4, further comprising, in response to the MDO signal exhibiting the transition about the zero value, incrementing the frequency of the local oscillator signal by a fine frequency amount, less than the coarse frequency amount, until the constant modulus indication value is above the threshold value.

6. The method of claim 2, further comprising setting the threshold value to a constant value across the wideband spectrum, such that the threshold value may be used to identify a frequency lock between the local oscillator frequency and a broadcast RF channel signal at any wavelength within the wideband spectrum.

7. The method of claim 6, further comprising setting the threshold value to a constant value, such that the threshold value may be used to identify a frequency lock between the local oscillator frequency and the broadcast RF channel signal independent of a power level on the broadcast RF channel signal.

8. The method of claim 1, further comprising:
   performing a low pass filtering on the RF channel signal;
   multiplying the RF channel signal by itself to produce a first RF channel magnitude signal; and
   performing a low pass filtering on the first RF channel magnitude signal to produce the magnitude of the constant modulus signal for the RF channel signal.

9. The method of claim 8, further comprising:
   subtracting the low pass filtered magnitude of the constant modulus signal from a first RF channel magnitude signal to produce a first RF channel noise signal; and
   taking the magnitude of the first RF channel noise signal and performing a low pass filtering on the result to produce the magnitude of the noise signal for the RF channel signal.

10. The method of claim 1, wherein comparing the magnitude of the constant modulus signal with the magnitude of the noise signal to determine a constant modulus indication value comprises:
    converting the magnitude of the constant modulus signal to a first decibel value;
    converting the magnitude of the noise signal to a second decibel value; and
    subtracting the second decibel value from the first decibel value to determine the constant modulus indication value.

11. The method of claim 1, further comprising demodulating the RF channel signal into an audio signal, video signal, or data signal.

12. The method of claim 1, further comprising adjusting the frequency of the local oscillator signal in response to the constant modulus indication value.

13. The method of claim 1, wherein the RF signal has a plurality of narrowband channels, the method further comprising determining a constant modulus indication value at plurality of frequencies within the wideband spectrum to identify each narrowband channel.

14. The method of claim 1, wherein the magnitude of the constant modulus signal is represented by $r^2$ and wherein the magnitude of the noise signal is represented by $n^2$, such that the comparison of the magnitude of the constant modulus signal with the magnitude of the noise signal is in accordance with the following formula, where CMI is the constant modulus indication value:

$$CMI = 10 \log_{10} \frac{r^2}{n^2}.$$

15. A radio frequency (RF) signal processing apparatus for use in a receiver for detecting a RF signal having at least one narrowband channel within a wideband spectrum for the RF signal, the receiver having an antenna for receiving the RF signal, a low noise amplifier and RF filter, a mixer for mixing the RF signal with a local oscillator signal a local oscillator frequency to produce a mixed RF signal, and an analog-to-digital converter for converting the mixed signal to a digital mixed signal, said apparatus comprising:
 a digital front end for determining an RF channel signal from the digital mixed signal; and
 a constant modulus indication apparatus configured:
  to receive the RF channel signal from the digital front end and to determine a magnitude of a constant modulus signal for the RF channel signal,
  to determine a magnitude of a noise signal for the RF channel signal, and
  to compare the magnitude of the constant modulus signal with the magnitude of the noise signal to produce a constant modulus indication value indicating a ratio of the magnitude of the constant modulus signal to the magnitude of the noise signal.

16. The RF signal processing apparatus of claim 15, further comprising an RF demodulator configured to demodulate the RF channel signal into an audio signal.

17. The RF signal processing apparatus of claim 15, further comprising an RF demodulator configured to demodulate the RF channel signal into a video signal.

18. The RF signal processing apparatus of claim 15, further comprising an RF demodulator configured to demodulate the RF channel signal into a data signal.

19. The RF signal processing apparatus of claim 15, wherein the constant modulus indication apparatus comprises:
 a first low pass filter to filter the RF channel signal before the RF channel signal is provided to an RF demodulator;
 a first apparatus to multiple the filtered RF channel signal by itself to produce the magnitude of the RF channel signal;
 a second low pass filter to filter the magnitude of the RF channel signal;
 a first apparatus to determine a difference signal between the filtered magnitude of the RF channel signal and the magnitude of the RF channel signal; and
 a second apparatus to multiple this difference signal by itself to determine the magnitude of the noise signal.

20. The RF signal processing apparatus of claim 19, further comprising
 a third apparatus to determine a first decibel level corresponding to the magnitude of the RF channel signal;
 a fourth apparatus to determine a second decibel level corresponding to the magnitude of the noise signal; and
 a fifth apparatus to determine the difference between first decibel level and the second decibel level as the constant modulus indication value.

21. The RF signal processing apparatus of claim 19, wherein the constant modulus indication apparatus comprises:
 a processor; and
 a computer-readable medium having computer-executable instructions that, when executed, cause the processor to:
  determine the magnitude of the constant modulus signal for the RF channel signal,
  determine the magnitude of the noise signal for the RF channel signal, and
  compare the magnitude of the constant modulus signal with the magnitude of the noise signal to produce the constant modulus indication value.

\* \* \* \* \*